July 21, 1931.  R. H. DART  1,815,869
AUTOMOBILE JACK
Filed July 11, 1928
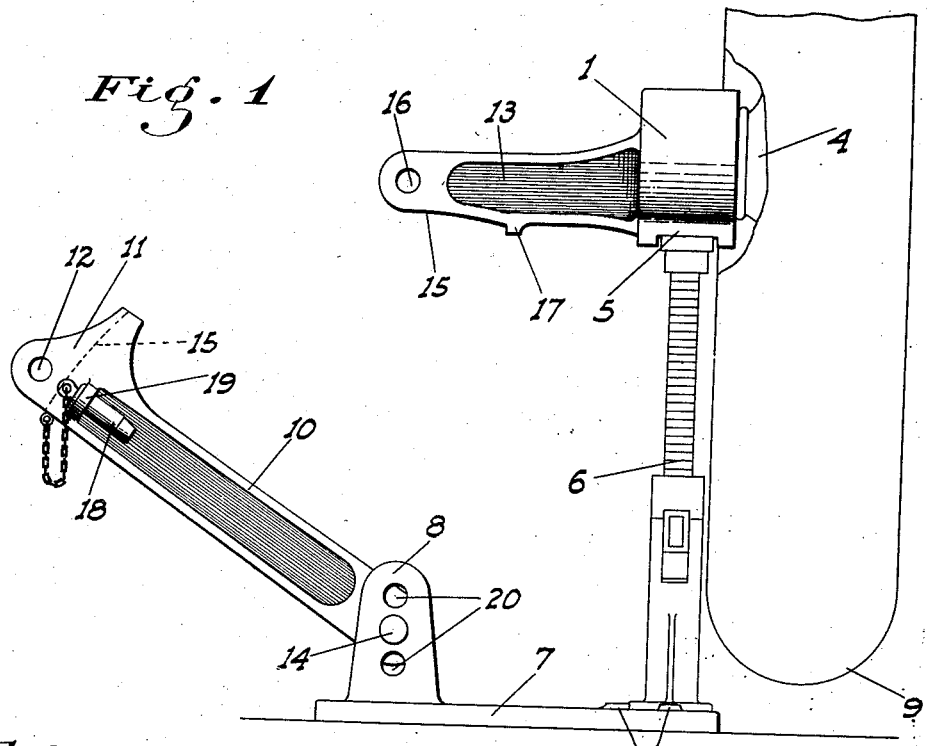
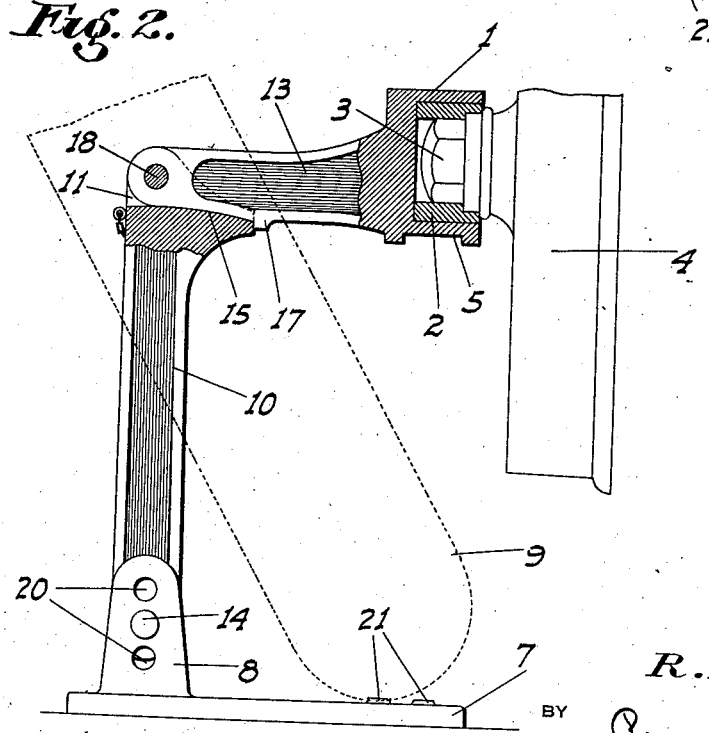
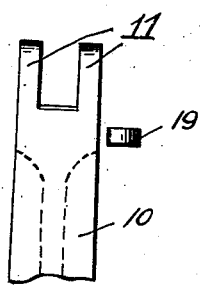
INVENTOR
R. H. Dart
BY
ATTORNEY Patented July 21, 1931

1,815,869

UNITED STATES PATENT OFFICE

ROBERT H. DART, OF SACRAMENTO, CALIFORNIA

AUTOMOBILE JACK

Application filed July 11, 1928. Serial No. 291,852.

This invention relates to devices for jacking up the wheels of motor vehicles for tire changing purposes and particularly represents improvements over the apparatus shown in my co-pending application for patent, Serial No. 251,116, filed February 1, 1928.

The principal object of the present invention is to provide a structure of the same general character and principle of operation as the former, and with the same advantages (namely to enable the wheel to be raised without placing a jack under the axle between the wheels) but which is of a greatly simplified and less expensive nature, which can more readily be made with the requisite strength without undue heaviness of parts, and which permits the use of an ordinary jack in connection with the improved structure. The purchaser may therefore, use his own jack if such is suitable and may thus save the additional expense which was necessary in connection with the previous device on account of the built-in jack feature thereof.

These objects I accomplish by means of such structure and relative arrangement of parts as will fully appear by a perusal of the following specification and claims.

In the drawings similar characters of reference indicate corresponding parts in the several views.

Fig. 1 is a side elevation of my improved structure shown as applied to a wheel and in connection with an ordinary jack before removing the tire.

Fig. 2 is a similar view partly in section showing the parts as cooperating to hold the wheel raised after the jack has been removed so as to enable the tire to be drawn away from the wheel.

Fig. 3 is a fragmentary end view of the supporting arm.

Referring now more particularly to the characters of reference on the drawings, the numeral 1 denotes a cylindrical socket member having a bushing 2 therein to closely engage the hub-cap 3 of a wheel 4. This bushing is preferably turnable in the socket member so that the wheel may turn in said member as desired; and is removable so that different bushings shaped to fit different shapes and sizes of hub-caps may be mounted therein. The underside of the socket is formed as a seat 5 for the head of an ordinary jack 6. This jack is preferably of the ratchet type which is placed as close to the wheel as possible and which rests on a plate 7, supported by the ground. Since even when the jack is as close to the wheel as possible it cannot (especially on rear wheels) be directly under the hub-cap, it is necessary for the bushing in the socket to have a fairly close fit on the cap so as to prevent any possibility of the socket tilting when the jack is applied to raise the wheel.

Upstanding from the plate 7 are ears 8 located a sufficient distance from the wheel to enable the tire 9 to be disposed between the jack and the ears when said tire is removed from the wheel. Pivoted between the ears is a rigid and substantial arm 10 whose upper end is forked as at 11 and has a transverse orifice 12 therethrough. These forks are adapted to receive the outer end of a rigid horizontal extension 13 therebetween, which extension projects from the outer end of the socket member 1 and is preferably formed integral therewith. The bottom of the fork-slot and the bottom surface of the extension are curved concentric with the pivot pin 14 of the arm as shown at 15; and the extension is provided with an orifice 16 therethrough which registers with the orifice 12 when the curved surfaces abut against each other and a stop 17 on the extension engages with the adjacent end of the fork.

By means of this arrangement if the extension 13 is raised a certain distance by jacking up the wheel, the arm 10 may then be swung upwardly into cooperating engagement with the extension without again moving or disturbing the extension in any manner. When the parts are thus engaged a removable pin 18 is passed through the orifice, this pin being preferably retained when not in use in a holder 19 mounted on one side of the arm. The bottom surface between the forks is of sufficient length to provide a generous extent of bearing area for the extension and it will be seen that the extension and arm then form a rigid unyielding unit as far as downward movement of the extension relative to the arm is concerned. The ears 8 preferably have a series of vertically spaced holes 20 therein to receive the pin 14, so as to enable the device to be readily used with wheels of different diameters and without having to jack up a small wheel to an excessive height before the separable parts can be pinned together as above described.

The base plate 7 preferably has locating lugs 21 for the base of the jack, so as to insure that when the jack engages the seat in the socket member, the arm 10 when raised to a vertical position will properly aline both lengthwise and transversely relative to the extension, so as to engage the same in cooperating relationship without any shifting of the plate being necessary after the jack is once mounted thereon.

In operation the socket member is first engaged with the hub-cap, and the plate 7, is then positioned relative to the wheel so that the jack when supported on the plate in its predetermined location will properly engage the seat 5. The wheel is then raised by manipulation of the jack the necessary distance so that the arm 10 when raised will receive the extension 13 between the forks as previously described. After a few trials with any one car the extent of raising may be easily gauged by the operator, and is facilitated by the use of a ratchet rather than a screw jack, since the raising of the wheel for each movement of the lever is a definite amount. The arm 10 is then raised to position, the pin 18 inserted and the jack is lowered and temporarily removed, the supporting units 10 and 13 then taking the weight. The tire is then removed from the wheel and drawn outwardly clear of the same a sufficient distance to permit of replacing the jack, the load is then again taken by the jack and the arm 10 is disconnected from the extension and swiveled away from said extension so as to rest on the ground. This obviously leaves a large opening through which the tire may be readily withdrawn. The replacement tire is then positioned and the manipulation of the arm and jack is repeated in the reverse order from the above to permit said tire to be mounted in place on the wheel.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A wheel raising structure comprising a socket member to engage the hub of the wheel, detachable means applied directly under said member for raising the wheel, a plate to rest on the ground outwardly of the wheel, an arm pivoted on and upstanding from the plate, an extension projecting horizontally from the socket member, and disengageable connection means between the upper end of the arm and the outer end of the extension arranged to prevent downward movement of the latter when the wheel raising means is removed.

2. A wheel raising structure comprising a socket member to engage the hub of the wheel, a plate to rest on the ground outwardly of the wheel, an arm pivoted on and upstanding from the plate, an extension projecting horizontally from the socket member, forks formed on the upper end of the arm, said extension passing between the forks and resting on the bottom surface thereof, a detachable pin through said forks and extension and means for supporting the socket from the ground when the forks and extension are disengaged.

3. A wheel raising structure comprising a socket member to engage the hub of the wheel, a plate to rest on the ground outwardly of the wheel, a jack to detachably rest on the plate and engage the socket member from below, an arm pivoted on the plate, an extension projecting outwardly from the socket member to detachably cooperate with the upper end of the arm, and locating means on the socket member and plate for the head and base respectively of the jack whereby when the plate is positioned relative to the socket member so that the jack parts engage the respective locating means, said arm and extension will then be positioned so as to properly cooperate with each other when the arm is swung upwardly toward the extension.

In testimony whereof I affix my signature.

ROBERT H. DART.